US009460200B2

(12) United States Patent
Friedlander et al.

(10) Patent No.: US 9,460,200 B2
(45) Date of Patent: Oct. 4, 2016

(54) ACTIVITY RECOMMENDATION BASED ON A CONTEXT-BASED ELECTRONIC FILES SEARCH

(75) Inventors: Robert R. Friedlander, Southbury, CT (US); James R. Kraemer, Santa Fe, NM (US); Josko Silobrcic, Swampscott, MA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/540,267

(22) Filed: Jul. 2, 2012

(65) Prior Publication Data
US 2014/0006391 A1 Jan. 2, 2014

(51) Int. Cl.
G06F 17/30 (2006.01)
(52) U.S. Cl.
CPC ... G06F 17/30722 (2013.01); G06F 17/30784 (2013.01)
(58) Field of Classification Search
CPC .............. G06F 17/30864; G06F 17/30; G06F 17/30722; G06F 17/30867; G06F 17/30908; G06F 17/30784
USPC .................................................. 707/754, 776
See application file for complete search history.

(56) References Cited

U.S. PATENT DOCUMENTS

| 5,450,535 A | 9/1995 | North |
| 5,664,179 A | 9/1997 | Tucker |
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |

(Continued)

FOREIGN PATENT DOCUMENTS

| EP | 1566752 A2 | 8/2005 |
| EP | 1843259 A2 | 10/2007 |

(Continued)

OTHER PUBLICATIONS

Filippova, Katja, and Keith B. Hall. "Improved video categorization from text metadata and user comments." Proceedings of the 34th international ACM SIGIR conference on Research and development in Information Retrieval. ACM, 2011.*

(Continued)

Primary Examiner — Nan Hutton
(74) Attorney, Agent, or Firm — John R. Pivnichny; Law Office of Jim Boice

(57) ABSTRACT

A computer hardware-implemented method, system, and/or computer program product generate an activity recommendation based on an identified non-synthetic event element in an electronic file. A context-based search of a database of electronic files is performed to identify a common synthetic event in all of the electronic files, where the synthetic event is a non-executable descriptor of a set of context-related factors. Each electronic file that contains the common synthetic event is a relevant electronic file. Each of the relevant electronic files are searched for at least one non-synthetic event element, wherein the non-synthetic event element is an event element that is absent from the synthetic event. A recommendation, based on the identified non-synthetic event element, is generated. A set of binary data, which includes the synthetic event, the relevant electronic file, the non-synthetic event element, and the recommendation, is then transmitted to a client.

19 Claims, 2 Drawing Sheets

(56) References Cited

U.S. PATENT DOCUMENTS

| | | |
|---|---|---|
| 6,199,064 B1 | 3/2001 | Schindler |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,058,628 B1 | 6/2006 | Page |
| 7,103,836 B1 | 9/2006 | Nakamura et al. |
| 7,209,923 B1 | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,799,323 B2 | 8/2014 | Nevin, III |
| 8,849,907 B1 | 9/2014 | Hession et al. |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212851 A1 | 11/2003 | Drescher et al. |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1* | 6/2007 | Forney .................. 707/101 |
| 2007/0136048 A1 | 6/2007 | Richardson-Bunbury et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1 | 7/2008 | Iselborn et al. |
| 2008/0172715 A1 | 7/2008 | Geiger et al. |
| 2008/0208813 A1* | 8/2008 | Friedlander et al. ........... 707/3 |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |

(56) References Cited

U.S. PATENT DOCUMENTS

| | | |
|---|---|---|
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lambda et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0291098 A1 | 10/2013 | Chung et al. |
| 2013/0311473 A1 | 11/2013 | Safovich et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074886 A1 | 3/2014 | Medelyan et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

Pryor, Graham. "Attitudes and aspirations in a diverse world: The Project StORe perspective on scientific repositories." (2006).*

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

M.J. Flynn, et al., "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, COGN Comput, 1, 2009, pp. 139-159.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

U.S. Appl. No. 13/342,305, Friedlander et al.—Specification Filed Jan. 3, 2012.

K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.

W. Caid et al., "Context Vector-Based Text Retrieval", Fair ISAAC Corporation, Aug. 2003, pp. 1-20.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

Visual Paradigm, "DB Visual Architect 4.0 Designer's Guide: Chapter 6—Mapping Object Model to Data Model and Vice Versa", 2007, pp. 6-2-6-26.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Avinash Kaushik, "End of Dumb Tables in Web Analytics Tools! Hello: Weighted Sort", Sep. 7, 2010, www.kaushik.net, pp. 1-15.

Evaggelio Pitoura et al., "Context in Databases", University of Ioannina, Greece, 2004, pp. 1-19.

J. Cheng et al., "Context-Aware Object Connection Discovery in Large Graphs", Data Engineering, 2009. ICDE '09. IEEE 25th International Conference on, pp. 856-867.

R. Angles et al., "Survey of Graph Database Models", ACM Computing Surveys, vol. 40, No. 1, Article 1, Feb. 2008, pp. 1-65.

U.S. Appl. No. 13/562,714, Robert R. Friedlander, et al.—Specification and Drawings Filed Jul. 31, 2012.

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.

U.S. Appl. No. 13/592,905—Non-Final Office Action Mailed May 8, 2013.

"Ninth New Collegiate Dictionary", Merriam-Webster Inc., 1991, pp. 77 and 242.

"The American Heritage College Dictionary", Fourth Edition, Houghton Mifflin Company, 2004, pp. 44 and 262.

U.S. Appl. No. 13/680,832—Non-Final Office Action Mailed Apr. 8, 2014.

U.S. Appl. No. 13/628,853—Notice of Allowance Mailed Mar. 4, 2014.

U.S. Appl. No. 13/595,356—Non-Final Office Action Mailed Apr. 14, 2014.

U.S. Appl. No. 13/540,230—Non-Final Office Action Mailed Jan. 30, 2014.

U.S. Appl. No. 13/540,295—Non-Final Office Action Mailed Jan. 30, 2014.

U.S. Appl. No. 13/609,710—Non-Final Office Action Mailed Jan. 27, 2014.

U.S. Appl. No. 13/342,406—Notice of Allowance Mailed Mar. 20, 2014.

(56) References Cited

OTHER PUBLICATIONS

U.S. Appl. No. 13/628,853—Non-Final Office Action Mailed Nov. 7, 2013.
U.S. Appl. No. 13/593,905—Notice of Allowance Mailed Oct. 25, 2013.
U.S. Appl. No. 13/755,623—Notice of Allowance Mailed May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action Mailed Jul. 1, 2014.
U.S. Appl. No. 13/609,710—Final Office Action Mailed Jul. 24, 2014.
U.S. Appl. No. 13/733,052—Non-Final Office Action mailed Sep. 18, 2014.
U.S. Appl. No. 13/861,058—Non-Final Office Action mailed Dec. 11, 2014.
U.S. Appl. No. 13/755,987—Non-Final Office Action mailed Jan. 2, 2015.
U.S. Appl. No. 13/648,801—Final Office Action mailed Jan. 13, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action mailed Jan. 28, 2015.
U.S. Appl. No. 13/732,567—Non-Final Office Action mailed Jan. 30, 2015.
U.S. Appl. No. 14/078,135—Notice of Allowance mailed Feb. 24, 2015.
U.S. Appl. No. 13/756,051—Notice of Allowance mailed Feb. 27, 2015.
U.S. Appl. No. 13/732,567—Non-Final Office Action mailed Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
S. Ceri et al., "Model-Driven Development of Context-Aware Web Applications", ACM, ACM Transactions on Internet Technology, 2007, (Abstract Only).
U.S. Appl. No. 13/610,523—Non-Final Office Action mailed Apr. 30, 2015.
U.S. Appl. No. 13/896,461—Non-Final Office Action mailed Apr. 21, 2015.
U.S. Appl. No. 13/609,710—Examiner's Answer mailed Jun. 9, 2015.
U.S. Appl. No. 13/780,779—Non-Final Office Action mailed Apr. 3, 2015.
U.S. Appl. No. 13/569,366—Non-Final Office Action mailed Jun. 30, 2015.
U.S. Appl. No. 13/648,801 Examiner's Answer Mailed October 1, 2015.

* cited by examiner

ACTIVITY RECOMMENDATION BASED ON A CONTEXT-BASED ELECTRONIC FILES SEARCH

BACKGROUND

The present disclosure relates to the field of computers, and specifically to the use of computers when searching for documents. Still more particularly, the present disclosure relates to the use of computers in searching for documents through the use of context-based searches.

Documents, such as technical articles, research papers, academic studies, web pages, blogs, etc. provide information on a wide range of topics. This diversity of information makes the documents valuable to many different types of projects. However, current document search techniques only identify documents that address a specific question/topic, such that a specific question can be answered and/or known information can be confirmed.

SUMMARY

A computer hardware-implemented method, system, and/or computer program product generates an activity recommendation based on an identified non-synthetic event element in an electronic file. A context-based search of a database of electronic files is performed to identify a common synthetic event in all of the electronic files, where the synthetic event is a non-executable descriptor of a set of context-related factors, and where a definition of the common synthetic event is unknown before performing the context-based search of the database of electronic files. Each electronic file that contains the common synthetic event is a relevant electronic file. Each of the relevant electronic files are searched for at least one non-synthetic event element, wherein the non-synthetic event element is an event element that is absent from the synthetic event. A recommendation, based on the identified non-synthetic event element, is generated. A set of binary data, which includes the synthetic event, the relevant electronic file, the non-synthetic event element, and the recommendation, is then transmitted to a client.

DETAILED DESCRIPTION

Figure 1:
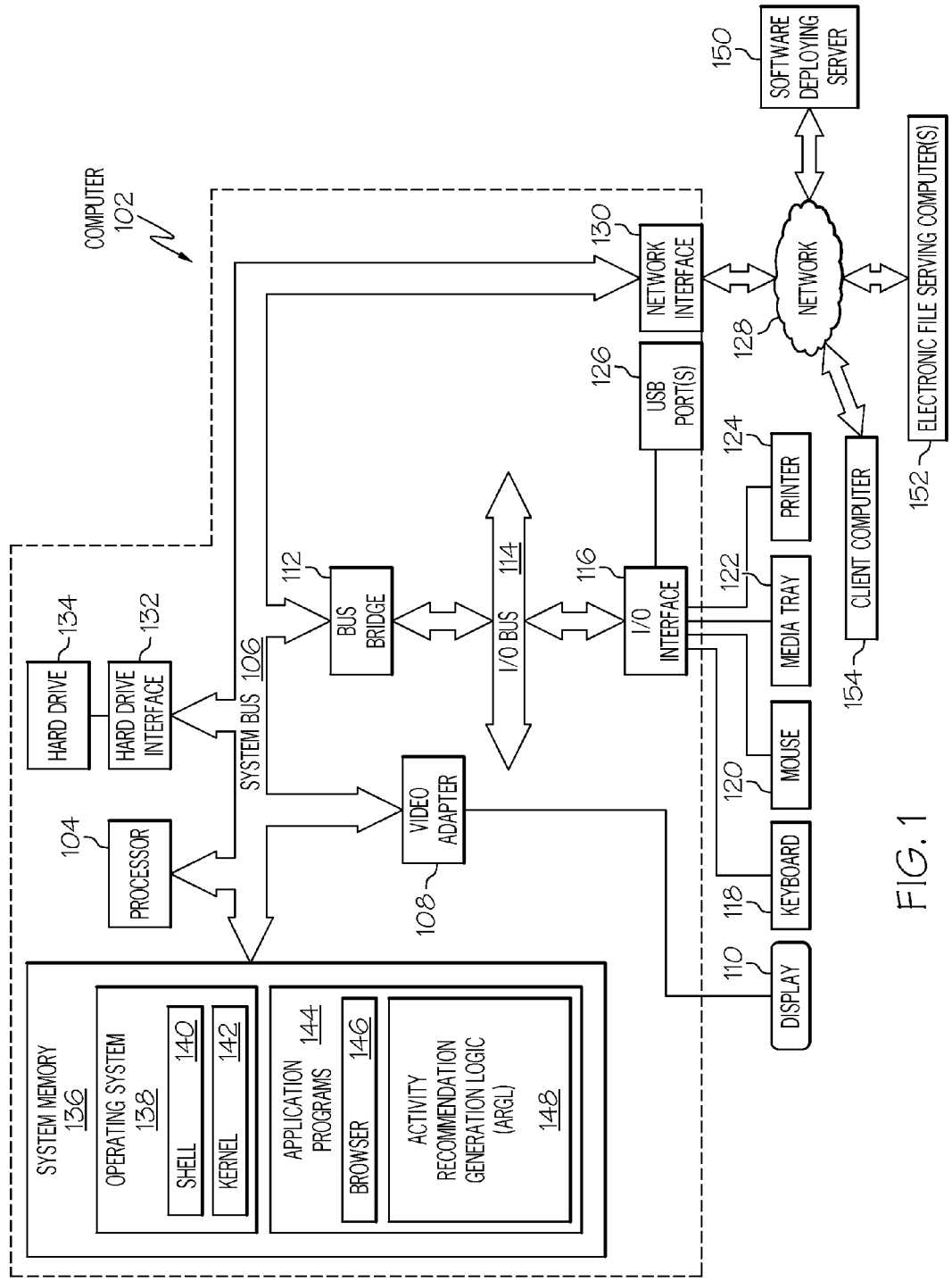
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, electronic file serving computer(s) 152, and/or client computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, as well as electronic file serving computer(s) 152 and client computer 154, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an activity recommendation generation logic (ARGL) 148. ARGL 148 includes code for implementing the processes described below, including those described in FIG. 2. In one embodiment, computer 102 is able to download ARGL 148 from software deploying server 150, including in an on-demand basis, wherein the code in ARGL 148 is not downloaded until needed for execution. Note further that, in one embodiment of the present invention, software deploying server 150 performs all of the functions associated with the present invention (including execution of ARGL 148), thus freeing computer 102 from having to use its own internal computing resources to execute ARGL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
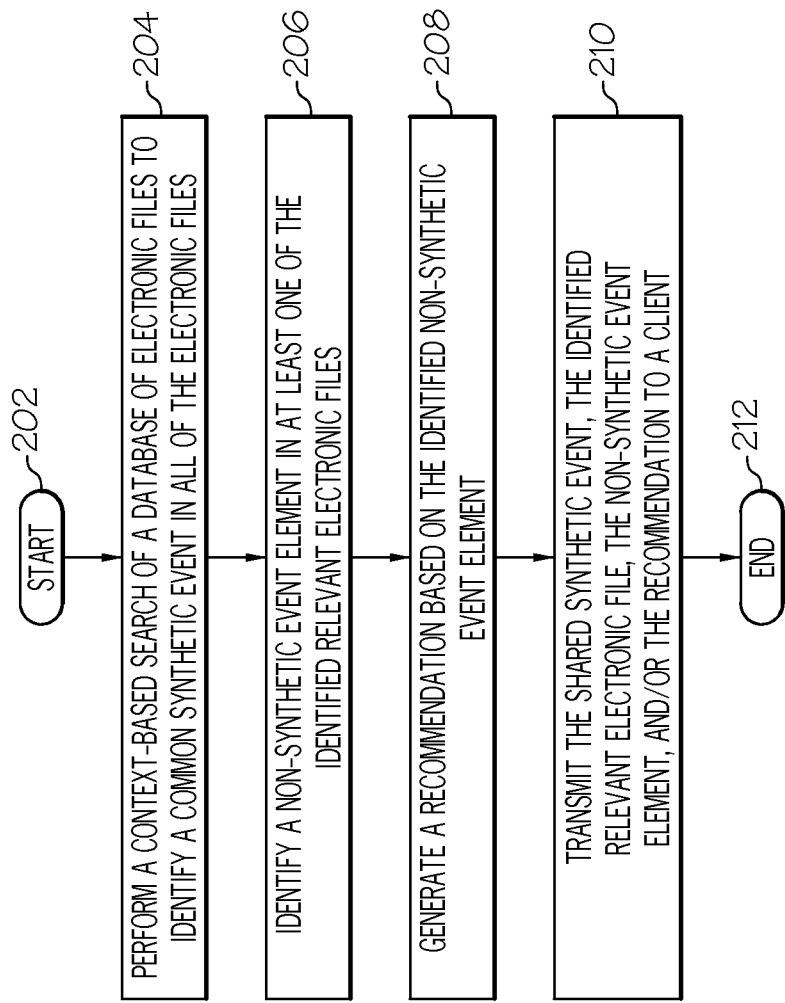
FIG. 2 is a high level flow chart of one or more exemplary steps taken by a processor to generate an activity recommendation based on identified non-synthetic event elements in electronic files.

With reference now to FIG. 2, a high level flow chart of one or more exemplary steps taken by a processor to generate an activity recommendation based on identified non-synthetic event elements in electronic files is presented. After initiator block 202, a context-based search of a database of electronic files is performed to identify a common synthetic event in all of the electronic files, where the synthetic event is a non-executable descriptor of a set of context-related factors (block 204). That is, all of the electronic files are context-searched to identify a shared (i.e., same) synthetic event that is contained in all of the electronic files. These electronic files are provided by electronic file serving computer(s), such as the electronic file serving computer(s) 152 depicted in FIG. 1.

The synthetic event is defined as a non-executable descriptor of set of context-related factors. For example, a synthetic event may be the occurrence of a set of words A, B, and C (i.e., the occurrence of all three words is the "factor") in a single document (i.e., where being within the same document is the "context").

Another example of a synthetic event may be a combination of facts about a patient, such as that patient's age, a medical diagnosis of a primary disease currently afflicting that patient, and a list of medications being taken by that patient ("factors") while the patient is being diagnosed for a secondary (caused by the primary disease) disease ("context").

Another example of a synthetic event may be a set of features being examined in a scientific laboratory while studying a particular disease. That is, in this example the "context" would be a research project that is directed towards understanding the etiology (underlying cause) of a particular disease, and the "factors" are the phenotype (physical appearance), genotype (genetic makeup), and environment (e.g., exposure to certain chemicals, etc.) common to persons having this particular disease.

The term "context-based search" is defined as a search of electronic files that have a predetermined contextual relationship to the synthetic event. For example, assume that the synthetic event is generated while conducting medical research in a particular field (e.g., oncology), such that the electronic files and the synthetic event are within the same context. In this example, the activity type (research) defines the scope of the context and thus the context-based search, such that only files directly related to oncology research are searched.

As used herein, an electronic file is defined as any file or collection of data. Examples of such files/data collections include, but are not limited to, text based documents, image files, and audio files. Examples of text based documents include, but are not limited to, text files, blogs, tweets, e-mail messages, web pages, instant messages, etc. Examples of image files include, but are not limited to, MPEG (Moving Picture Experts Group) files for movies, JPEG (Joint Photographic Experts Group) files for still photos, TIFF (Tagged Image File Format) and PDF (Portable Document Format) files for scanned documents, DICOM (Digital Imaging and Communications in Medicine) files for medical images, FITS (Flexible Image Transport System) files for astronomy images, etc. Examples of audio files include, but are not limited to, audio recordings (e.g., WAV files, MP3 files, VOX files, etc.) generated from a microphone or other sound capturing device.

When searching for a text based document that contains certain words/phrases, a simple word search is performed on each document (electronic file) in a file database (e.g., research papers, magazine articles, etc. on the Internet on in a local database). Before performing this word search of the text based document, however, a determination is first made as to whether this text based document is contextually related to (or alternatively, contextually unrelated to) the synthetic event, such that the search of the electronic files is context-based. For example, assume that a synthetic event is that a "city" has an average high temperature of "90 degrees." Before determining if an electronic document contains the synthetic event element "90 degrees", a determination is first made as to whether the electronic document is actually related to meteorology. This determination can be made by a search of "keywords" listed for many articles. These keywords provide words (such as "meteorology") that describe the context of the text based document. However, if no such keyword listing exists, then the document must be examined for context.

For example, if a search identifies words such as "diploma" and "curriculum" in a particular electronic file, then the "90 degrees" is probably describing a college, and is skipped. Similarly, if the phrases "right angle" or "food" or "patient" or "channel iron" are in a particular electronic file, these files are also skipped in the first embodiment ("context-aligned"), since the content of such an electronic file is not contextually related. That is, the context-based search is not interested in, and therefore ignores, articles about a college that offers diplomas in 90 different disciplines ("90 degrees" that are offered by academia), math publications about right angles ("90 degrees" of arc), articles about food preparation (recommending that a sauce be kept at a temperature above "90 degrees"), articles about patients having hypothermia (describing a patient's core body temperature dropping down to "90 degrees"), or brochures about structural iron (advertising "90 degree" channel iron).

However, if terms such as "weather" or "drought" occur in an electronic file, then that electronic file is likely related to the synthetic event ("city having an average high temperature of 90 degrees"), and is thus identified as a contextually-related ("context-aligned") and therefore relevant electronic file.

Note that in another embodiment, the determination of the context of the searched text based document is made after the synthetic event element is identified in a particular document/electronic file. For example, assume that a text based document is short (less than a predetermined number of words) and does not have a "keyword" listing. In this case, a search is made for the terms "city" and "90 degrees" in the document. If the terms are found in the document, then a context evaluation (using context determination methodology such as that described herein) determines whether that document is relevant before searching for the synthetic event in that document.

While searching a text based document can be performed as described above, searching for a synthetic event in a video file requires additional processing. First, a query is made to determine whether metadata describing the synthetic event, as well as metatags describing the images being searched, are available. If so, then the metadata/metatag is simply searched for, as with a text search. However, if such metadata is not available (or at least not with the degree of specificity needed to identify the synthetic event), then image matching must be performed. That is, a particular image (e.g., a bright spot) that makes up part of the video file's synthetic event (a retina having a bright spot indicating a hole in the retina) is digitized into a binary value. This binary value, along with other digitized images (i.e., digital files describing the retina) from the synthetic event, are then searched for in other digitized electronic video files. A similar process occurs with audio files, in which a particular sound (e.g., screeching tires as a "context-related factor" within the "context" of an automobile accident) is digitized into a binary value, which is used in the search of digitized electronic audio files.

In one embodiment, the electronic files that are selected for searching are based on a ranking of their source, in which the ranking is based on a public reputation of the source. For example, assume that a particular electronic file is from a known, trusted, and highly respected source (e.g., a prestigious research journal). This description of the source ("known, trusted, highly respected") leads to a weighting of this particular source. For example, this source may be given a weighting of "9" (on a scale of 1-10). Another electronic file, however, comes from a source that is given a weighting of only "2", since it comes from a blog entry that has not been peer-reviewed, and the author is anonymous. In this example, the higher ranked ("9") source is weighted higher than the lower ranked ("2") source. In one embodiment, the higher ranked sources are searched before the lower ranked source down to some predetermined baseline. That is, a predetermination may be made that only sources ranked between 9-10 will be initially searched for relevant electronic files. If time, computer resources, and/or money are still available, then sources ranked between 7-8 will be searched. The process continues until 1) there is no more time, computer resources, money, etc. available; 2) all available electronic files have been examined (e.g., within a local database); or 3) only available electronic files ranked higher than some predetermined number (e.g., those electronic files whose sources are ranked higher than "7") have been predetermined to be authorized for examination, and all such ranked electronic files have been examined.

In one embodiment, the ranking of the source of the electronic files is based on an historical frequency of usage of the source by a generator of the synthetic event. For example, assume that a particular user and/or computer system routinely examines a particular database for electronic files. In a first embodiment, a source that is frequently used is deemed to be more trustworthy, and thus is weighted higher. However, in a second embodiment, a less frequently used (and thus more obscure) source is deemed to be more likely to provide a non-synthetic event element (described below) that has not been previously considered, and thus is weighted higher. In either embodiment, the higher ranked sources are searched before the lower ranked source down to some predetermined baseline, as described above.

Note that in block 204, the synthetic event is not known before the search is performed. That is, the process of searching the electronic files identifies a common synthetic event in two or more of the electronic files. Thus, the search does not begin by searching for a known synthetic event.

With referenced now to block 206, each relevant electronic file (i.e., those files that are within a same context) is then searched for non-synthetic event elements (i.e., event elements that are absent from the synthetic event). For example, assume that the synthetic event is the occurrence of the words/terms A, B, and C within a same document (e.g., a patient's file). Assume further that the search described in block 204 was for all on-line publications that have the terms A, B, and C within a same publication (electronic file), and that one or more relevant publications (i.e., that have all of the terms A, B, and C within the same document) have been identified. Once such a relevant electronic file is located, a context-based search is performed on that electronic file, in order to identify non-synthetic event elements within that electronic file. A non-synthetic event element is an event element that is not found in the synthetic event. In the case of a simple word search, a non-synthetic event element would be the presence of a word/term D, which is not found in the synthetic event (which had the words/terms A, B, and C). Of course, one or both documents will contain other words/terms, but these have been predetermined to be irrelevant to the process described herein.

In another example, assume that the synthetic event is that a city has an average high temperature of 90 degrees. Assume further that the identified relevant electronic file also contains a description of a city's population level, which bears no relation to the city's weather, and thus is absent from the synthetic event. However, if a high percentage (e.g., more than some predetermined percentage) of the electronic files describe the same population level, then this correlation may be deemed significant to refining current studies, policies, etc. For example, if a large percentage of electronic files describe cities having an average temperature of 90 degrees and a population of over 2 million, then the non-synthetic event element ("population over 2 million") might suggest the need for creating a policy regarding what type of health care resources will be needed for a known percentage (e.g., 2%) of city residents who will likely suffer from heat-related injuries during a given year.

With reference now to block 208, a recommendation is generated based on the identified non-synthetic event element(s) found in the identified relevant electronic file(s). In one embodiment, however, software logic (e.g., part of ARGL 148 described in FIG. 1) generates a recommendation, which may be sent to a client computer (e.g., the client computer 154 shown in FIG. 1) based on the identified non-synthetic event element(s). Such a recommendation may be to 1) conduct an activity that is unrelated to a user activity that resulted in the generation of the synthetic event (i.e., the synthetic event describes factors related to the user activity), or 2) perform additional steps related to this original user activity.

For example, assume that a user and/or a computer logic generated a synthetic event describing factors related to a scientific laboratory research being performed by a user. This user activity may be a study of blood samples from a particular set of patients that have hepatitis, are over 65 years of age, and are omnivores (collectively referred to as "synthetic event A"). A search of electronic files, using the process described herein, reveals one or more electronic files that contain synthetic event A, and which also contain non-synthetic event elements, such as a reference to a particular athletic team.

There may be nothing in the identified relevant electronic file, or in any other electronic file, that correlates synthetic event A with being a fan of this particular athletic team, since the two seemingly are unrelated. However, context-based computer logic can make an inference that the two are related, and will thus generate a recommendation to the user to study their connection. Thus, a recommendation can be computer generated to 1) study health hazards associated with attending games played by this particular athletic team. That is, a recommendation can then be made to research topics related to the specific athletic team, which may lead to a vendor identified by the context-based computer logic, or it may lead to previously unreported factors (e.g., housekeeping/sanitation processes in place at the stadium venue of this particular athletic team, etc.).

In one embodiment, the inference that synthetic event A and the particular athletic team are related may be prompted by the context-based computer logic recognizing that many (more than some predetermined number/percentage) electronic files reference both synthetic event A and this particular athletic team.

In another embodiment, this inference that synthetic event A and the particular athletic team are related may be prompted by the context-based computer logic associating this particular athletic team to a particular venue (in one electronic file), associating this particular venue to a particular vendor (in another electronic file), and associating this particular vendor to a health code violation citation (in yet another electronic file), thus leading the context-based computer logic to recognize a possible connection between synthetic event A and the particular athletic team.

Alternatively, a recommendation can be made to 2) perform additional laboratory tests on the blood samples from the particular set of patients described by synthetic event A. For example, assume that the current scientific laboratory research that resulted in the creation of synthetic event A was only directed to making microscopic examinations of the blood samples. Based on the identified non-synthetic event element(s), a recommendation may be made to perform a genetic study of the blood samples, in order to determine if there are any genetic mutations associated with both synthetic event A and this particular athletic team. This proposition may initially appear unfounded. However, an examination of the genome's integrity may offer clues/information that actually supports the proposition, or at least offers guidance in a new research direction.

In another embodiment of the present invention, assume that the synthetic event describes factors related to diagnosing a medical patient. That is, assume that the synthetic event is that a particular patient has hypertension, is over 65 years of age, and is an omnivore (collectively referred to as "synthetic event B"). However, the health care provider is unable to diagnose a secondary disease (which is caused by the primary disease of hypertension) based on these factors and the patient's complaint of chronic fatigue. A search of the electronic files databases (e.g., from the Internet) reveals one or more documents (relevant electronic files) that include the synthetic event B as well as a non-synthetic event element, such as a reference to a local power generation plant. Based on the type of analysis described above, a recommendation may be generated to 1) conduct an activity that is unrelated to the user activity that resulted in the generation of the synthetic event, or 2) conduct additional steps related to this user activity. That is, 1) a recommendation can be made to study environmental issues around the identified local power generation plant. Alternatively, 2) a recommendation can be made to the health care provider to perform a genetic study of the particular patient. Again, while such a study would initially appear to be unnecessary, the relevant electronic file provides the necessary information to prompt such additional testing.

As described in block 210, a set of binary data is then sent to the client computer. This set of binary data includes 1) the shared synthetic event; 2) the identified relevant electronic file (or at least its location); 3) a description of an identified non-synthetic event element within the relevant electronic file; and 4) the recommendation. That is, this set of binary data (which can be manipulated by a processor) includes the shared synthetic event itself (e.g., synthetic event A described above). This set of binary data also includes the relevant electronic file itself, or at least a location descriptor (e.g., a hyperlink, universal resource locator (URL), file pathway, etc.) of that relevant electronic file to the computer that provided the synthetic event description. In addition, this set of binary data includes a description of non-synthetic event elements. Thus, in the meteorological example presented above, the synthetic event would be that a city has an average high temperature of 90 degrees, the relevant electronic file would be a document that describes how many people live in the same city (or alternatively another city) that has an average high temperature of 90 degrees, and the description of the identified non-synthetic event element is the number of people who live in the same city (or alternatively another city). Finally, this set of binary data includes the recommendation that is based on the identified non-synthetic event element.

The process depicted in FIG. 2 ends at terminator block 212.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer hardware-implemented method of generating an activity recommendation based on an identified non-synthetic event element in an electronic file, the computer hardware-implemented method comprising:
   performing a context-based search of a database of electronic files to identify a common synthetic event in all of the electronic files, wherein the synthetic event is a non-executable descriptor of a set of context-related factors, wherein a definition of the common synthetic event is unknown before performing the context-based search of the database of electronic files, wherein the database of electronic files is a database of video files, and wherein electronic files that each contain the common synthetic event are relevant electronic files;

searching each of the relevant electronic files for at least one non-synthetic event element, wherein the non-synthetic event element is absent from the synthetic event;

generating a recommendation based on the identified non-synthetic event element;

transmitting a set of binary data to a client computer, wherein the set of binary data contains the synthetic event, the relevant electronic file, said at least one non-synthetic event element, and the recommendation;

determining whether metadata describing the synthetic event is available from the video files; and in response to determining that the metadata describing the synthetic event is not available from the video files, performing image matching of a particular video file to the database of video files by:
  digitizing a particular image that makes up part of a synthetic event for the particular video file; and
  searching the video files for the particular image that makes UP part of the synthetic event for the particular video file.

2. The computer hardware-implemented method of claim 1, wherein the recommendation recommends performing additional steps related to a user activity that resulted in a generation of the synthetic event.

3. The computer hardware-implemented method of claim 1, wherein the database of electronic files further includes a database of text-based documents, and wherein the computer hardware-implemented method further comprises:
  performing a word search of a particular text document in the database of text based documents for a keyword that identifies the particular text document as being contextually related to the synthetic event; and
  in response to not finding the keyword in the particular text document, searching the particular text document for secondary context words to identify the particular text document as being contextually related to the synthetic event.

4. The computer hardware-implemented method of claim 1, wherein the synthetic event describes a user activity, and wherein the computer hardware-implemented method further comprises:
  determining a context for the context-based search based on an activity type of the user activity.

5. The computer hardware-implemented method of claim 1, further comprising:
  ranking a source of the relevant electronic file, wherein the ranking is based on a public reputation of the source; and
  weighting the identified non-synthetic event element based on said ranking.

6. The computer hardware-implemented method of claim 1, further comprising:
  ranking a source of the relevant electronic file, wherein the ranking is based on an historical frequency of usage of the source by a generator of the synthetic event; and
  weighting the identified non-synthetic event element based on said ranking.

7. A computer program product for identifying non-synthetic event elements in electronic files, the computer program product comprising:
  a non-transitory computer readable storage media;
  first program instructions to perform a context-based search of a database of electronic files to identify a common synthetic event in all of the electronic files, wherein the synthetic event is a non-executable descriptor of a set of context-related factors, wherein the common synthetic event is unknown before performing the context-based search of the database of electronic files, wherein the database of electronic files is a database of video files, and wherein electronic files that each contain the common synthetic event are relevant electronic files;
  second program instructions to search each of the relevant electronic files for at least one non-synthetic event element, wherein the non-synthetic event element is absent from the synthetic event;
  third program instructions to generate a recommendation based on the identified non-synthetic event element;
  fourth program instructions to transmit a set of binary data to a client computer, wherein the set of binary data contains the synthetic event, the relevant electronic file, said at least one non-synthetic event element, and the recommendation;
  fifth program instructions to determine whether metadata describing the synthetic event is available from the video files; and
  sixth program instructions to, in response to determining that the metadata describing the synthetic event is not available from the video files, perform image matching of a particular video file to the database of video files by:
    digitizing a particular image that makes UP part of a synthetic event for the particular video file; and
    searching the video files for the particular image that makes UP part of the synthetic event for the particular video file; and wherein
  the first, second, third, fourth, fifth, and sixth program instructions are stored on the computer readable storage media.

8. The computer program product of claim 7, wherein the recommendation recommends performing additional steps related to a user activity that resulted in a generation of the synthetic event.

9. The computer program product of claim 7, wherein the synthetic event describes factors related to a user activity, wherein the user activity is scientific laboratory research, and wherein the computer program product further comprises:
  seventh program instructions to generate a recommendation to research topics related to the identified non-synthetic event element; and wherein
  the seventh program instructions are stored on the non-transitory computer readable storage media.

10. The computer program product of claim 7, wherein the synthetic event describes factors related to a user activity, wherein the user activity is diagnosing a medical patient, and wherein the computer program product further comprises:
  seventh program instructions to generate a recommendation to perform additional medical tests, on the medical patient, which are related to the identified non-synthetic event element; and wherein
  the seventh program instructions are stored on the non-transitory computer readable storage media.

11. The computer program product of claim 7, wherein the synthetic event describes a user activity, and wherein the computer program product further comprises:
- seventh program instructions to determine a context for the context-based search based on an activity type of the user activity; and wherein
- the seventh program instructions are stored on the non-transitory computer readable storage media.

12. The computer program product of claim 7, further comprising:
- seventh program instructions to rank a source of the relevant electronic file, wherein the ranking is based on a public reputation of the source; and
- eighth program instructions to weight the identified non-synthetic event element based on said ranking; and wherein
- the seventh and eighth program instructions are stored on the non-transitory computer readable storage media.

13. The computer program product of claim 7, further comprising:
- seventh program instructions to rank a source of the relevant electronic file, wherein the ranking is based on an historical frequency of usage of the source by a generator of the synthetic event; and
- eighth program instructions to weight the identified non-synthetic event element based on said ranking; and wherein
- the seventh and eighth program instructions are stored on the non-transitory computer readable storage media.

14. A computer system comprising:
- a central processing unit (CPU), a computer readable memory, and a computer readable storage media;
- first program instructions to perform a context-based search of a database of electronic files to identify a common synthetic event in all of the electronic files, wherein the synthetic event is a non-executable descriptor of a set of context-related factors, wherein the common synthetic event is unknown before performing the context-based search of the database of electronic files, wherein the database of electronic files is a database of video files, and wherein electronic files that each contain the common synthetic event are relevant electronic files;
- second program instructions to search each of the relevant electronic files for at least one non-synthetic event element, wherein the non-synthetic event element is absent from the synthetic event;
- third program instructions to generate a recommendation based on the identified non-synthetic event element;
- fourth program instructions to transmit a set of binary data to a client computer, wherein the set of binary data contains the synthetic event, the relevant electronic file, said at least one non-synthetic event element, and the recommendation;
- fifth program instructions to determine whether metadata describing the synthetic event is available from the video files; and
- sixth program instructions to, in response to determining that the metadata describing the synthetic event is not available from the video files, perform image matching of a particular video file to the database of video files by:
  - digitizing a particular image that makes UP part of a synthetic event for the particular video file; and
  - searching the video files for the particular image that makes up part of the synthetic event for the particular video file; and wherein
- the first, second, third, fourth, fifth, and sixth program instructions are stored on the computer readable storage media for execution by the CPU via the computer readable memory.

15. The computer system of claim 14, wherein the recommendation recommends performing additional steps related to a user activity that resulted in a generation of the synthetic event.

16. The computer system of claim 14, wherein the synthetic event describes factors related to a user activity, wherein the user activity is scientific laboratory research, and wherein the computer system further comprises:
- seventh program instructions to generate a recommendation to research topics related to the identified non-synthetic event element; and wherein
- the seventh program instructions are stored on the computer readable storage media for execution by the CPU via the computer readable memory.

17. The computer system of claim 14, wherein the synthetic event describes factors related to a user activity, wherein the user activity is diagnosing a medical patient, and wherein the computer system further comprises:
- seventh program instructions to generate a recommendation to perform additional medical tests, on the medical patient, which are related to the identified non-synthetic event element; and wherein
- the seventh program instructions are stored on the computer readable storage media for execution by the CPU via the computer readable memory.

18. The computer system of claim 14, wherein the synthetic event describes factors related to a user activity, and wherein the computer system further comprises:
- seventh program instructions to determine a context for the context-based search based on an activity type of the user activity; and wherein
- the seventh program instructions are stored on the computer readable storage media for execution by the CPU via the computer readable memory.

19. The computer system of claim 14, further comprising:
- seventh program instructions to rank a source of the relevant electronic file, wherein the ranking is based on a public reputation of the source; and
- eighth program instructions to weight the identified non-synthetic event element based on said ranking; and wherein
- the seventh and eighth program instructions are stored on the computer readable storage media for execution by the CPU via the computer readable memory.

* * * * *